Patented May 13, 1924.

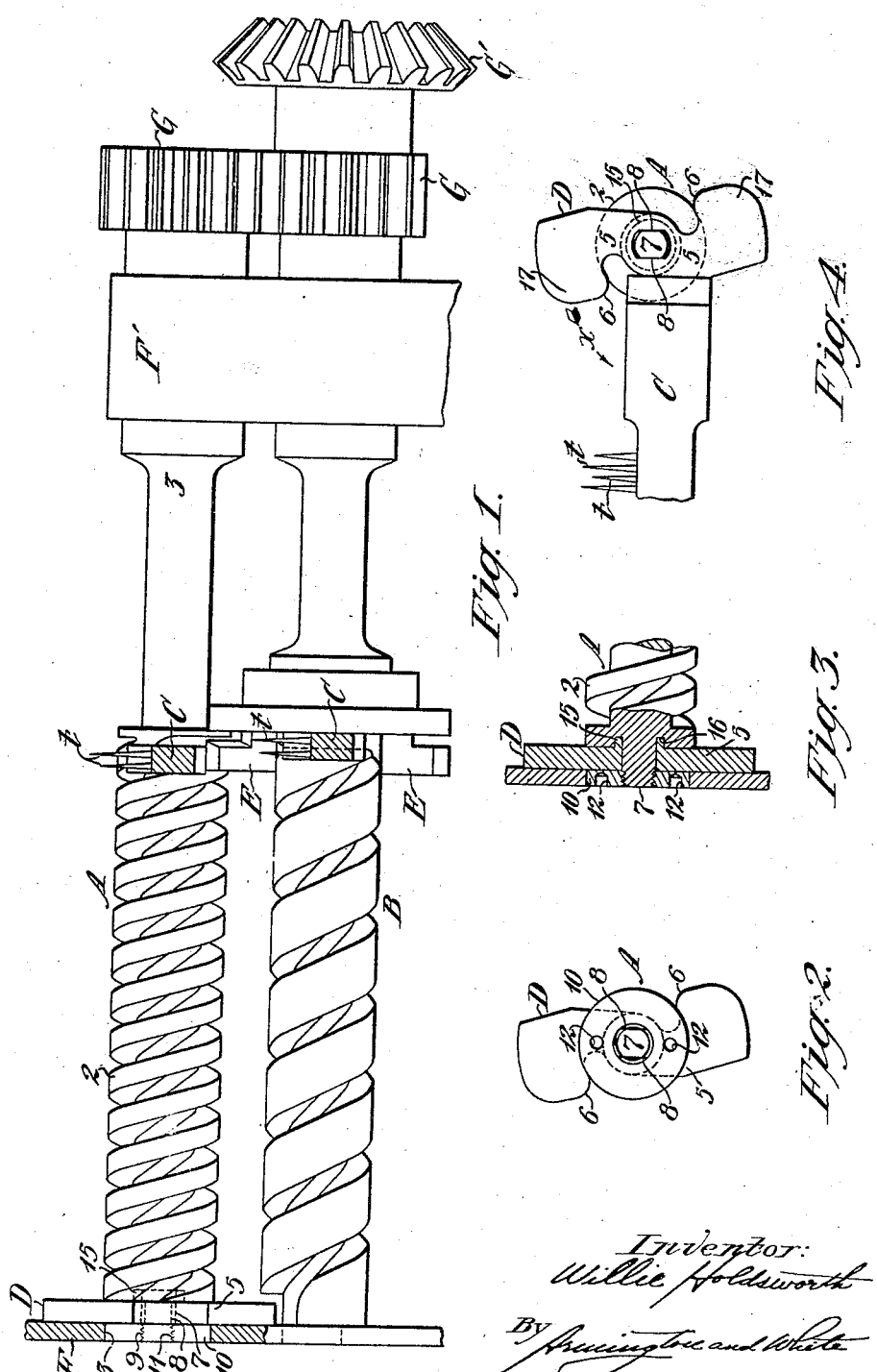

1,493,860

UNITED STATES PATENT OFFICE.

WILLIE HOLDSWORTH, OF PROVIDENCE, RHODE ISLAND.

TOP SCREW FOR GILL-DRAWING FRAMES.

Application filed May 31, 1923. Serial No. 642,451.

*To all whom it may concern:*

Be it known that I, WILLIE HOLDSWORTH, a citizen of the United States, residing at Providence, in the county of Providence, State of Rhode Island, have invented certain new and useful Improvements in Top Screws for Gill-Drawing Frames, of which the following is a specification.

This invention relates to gill-drawing frames and consists in improvements in the construction and arrangement of the top-screws therefor.

The principal object of the invention is to provide an improved means for attaching the faller-cam to the top-screw whereby its cam faces will bear a definite relation to the threads of the screw so that a broken or damaged cam may be removed and replaced by a new cam whose cam-faces will assume the correct relation to the screw threads.

My present invention relates particularly to a type of cam-mounting for the top-screw similar to that shown in my prior United States Letters Patent No. 1,394,829, dated October 25, 1921, and the present improvement resides particularly in a novel means for strengthening and stiffening the cam at its weakest points, while providing a more extended and firmer support for the cam on the screw.

To this end the present invention consists essentially in providing the cam with a projecting hub which strengthens the cam at the points where its arms are reduced or cut away; and in seating the said hub in a counterbore or recess at the end of the screw whereby the cam is more firmly and securely held in place on the screw.

The manner and means for carrying out the invention are fully described in the following specification which is illustrated by the accompanying drawings. In the drawings:

Fig. 1 is a side elevation of the top-screw of a gill-drawing frame, showing my improvements as applied to use thereon and illustrating the top-screw in cooperative relation with the bottom-screw of the machine;

Fig. 2, an end view of the top-screw showing the collar or nut which holds the cam in place at the end of the top-screw and also serves as a bearing member for mounting the screw in the machine;

Fig. 3, a sectional view of the end-portion of the top-screw, taken in a plane intersecting the axis thereof and illustrating the cam in place on the end stud of the screw with its hub seated in the counterbore surrounding the stud; and Fig. 4, an end view of the top-screw showing the cam in place thereon and illustrating the manner in which said cam acts on the faller-bars of the machine.

Referring to Fig. 1 of the drawings, the operative mechanism of the gill-drawing frame comprises, in general, two sets of top and bottom-screws A and B (only one set being herein shown) arranged in opposite, parallel relation and adapted to traverse the gill-bars or fallers C back and forth in the machine. The faller-bars or combs C are supported to slide on horizontal guides or saddles, not herein shown, with their ends engaging the threads in the opposite screws to cause them to be traversed therefrom. The top-screws A propel the fallers C in one direction, and as they reach the end of their operative stroke they are carried down into engagement with the threads of the bottom-screws B, whereby they are traversed back in the opposite direction and then lifted and returned again to the top-screws. In this way a continuous movement is imparted to the fallers to pass them back and forth in horizontal paths at different levels. As the fallers C reach the end of the top-screws A they ride out of the screw-threads thereof and also slide off from the ends of the top-saddles. At this point they are operated upon by the faller-cams D at the ends of the top-screws A which come into contact with the bars to force them down into engagement with the bottom-screws B. The bars C are then returned to the opposite end of the bottom-screws B and, as they ride out of the threads thereof, another set of cams E, carried by the bottom-screws, act to lift them into position to engage their ends with the top-screws once more. The above described arrangement is common to practically all types of gill-drawing frames, one form of such a frame being described more specifically in my prior U. S. Letters Patent No. 1,347,331, dated July 20, 1920.

Fig. 1 illustrates only one set of top and bottom-screws, A and B, but it will be understood that these parts are duplicated on the opposite side of the machine; the faller-bars C being arranged to extend horizontally between the two opposite screws of each pair to engage their ends with the threads of the screws. As shown in Fig. 1, the top and bottom-screws A and B are journaled in upright bearings F and F' supported from the machine frame, and at one end they are connected rotatively by means of intermeshing spur-gears G—G. On the outer end of the bottom-screw B is a bevel-gear G' through which both screws are driven from the main power-shaft of the machine, not herein shown.

As before indicated, my present invention relates to the top-screw A, and particularly to the means for fastening the cam D thereto, and for mounting the screw in its end-bearing. The screw A is usually constructed from a single length of rod or shaft having the enlarged square-threaded portion 2 at one end and the reduced shank portion 3 at the other. The threads of the screw are of double pitch or, in other words, there are two threads extending the length of the screw 2 and terminating at diametrically opposite points at its ends. The cam-member D is secured to the outer end of the screw 2 and consists essentially of a flat bar or plate having opposite radial arms 5 formed with projecting cam-faces 6 on their sides. Each of the cam-faces 6 functions in connection with its respective screw-thread, to which it must bear a certain definite relation in order that it may properly engage the faller-bar as the latter emerges from the end of the thread groove.

Heretofore, it has been the usual practice to provide a threaded stud or extension at the end of the screw 2 to adapt the cam D to be screwed onto it to seat against the screw. As before stated, the cam-faces 6 on the cam-member D must bear a certain definite relation to the points where the grooves of the screw-threads emerge at the end of the screw in order that the engagement of the cams with the faller-bars will be timed synchronously with the disengagement of the bars from the screw. That is to say, the cam-faces 6 must be brought into engagement with the tops of the faller-bars C, see Fig. 4, just as the latter slide out from the thread-grooves at the end of the screw. If this engagement is made too soon the bars will be jammed in the threads of the screw resulting in straining or breaking the parts; while if the engagement is delayed the bars will not be carried down at the proper instant to enter the leading ends of the threads on the bottom-screws. It will thus be seen that the cam-member D must be set very accurately in relation to the screw-threads and where, as heretofore, its hub has been screwed onto the stud at the end of the top-screw it has been a very difficult matter to secure this exact corelation between the parts. That is to say, the thread on the stud must be started at a fixed point in relation to the end of the threads on the screw 2, and the thread in the bore of the cam D must also start at the proper point. In manfacturing the screws in quantity it has been found extremely difficult, in fact, well nigh impossible, to obtain uniformity in the relation between the cams and the screw-threads. Each screw must have its cam fitted and adjusted separately, and when a cam becomes worn or broken in use it is impossible to replace it with a new cam without removing the top-screw from the machine and sending it back to the factory to be fitted. In some cases attempts have been made to fit a new cam to the top-screw by filing off its face or by inserting shims or washers between its hub and the end of the screw, but such a practice does not produce satisfactory results. The cams are constructed of hardened steel and must be annealed before they can be filed or ground off, and after being so treated must be rehardened before being put into use again.

In my U. S. Letters Patent No. 1,394,829, previously referred to, there is illustrated and claimed an improved method of fastening the cam D in place on the top-screw 2 by means of a stud 7 projecting from the end of the top-screw as shown in the present drawings. The stud 7 is constructed integral with the screw 2, being of somewhat less diameter than the body of the screw and having its sides flatted off at 8. The flat sides 8 of the stud 7 bear a certain definite relation to the ends of the thread-grooves in the screw 2 and the cam D is formed with an axial opening having corresponding flat sides to adapt it to fit the stud and to be held from turning thereon. The outer end of the stud 7 is screw-threaded at 9 to adapt it to receive a collar or nut 10 having an interiorly threaded bore 11. The collar 10 is usually of the same diameter as the outer threads of the top-screw 2 and is provided with sockets 12 in its face adapted to receive the prongs of a wrench or spanner, by means of which it may be screwed onto the stud 7.

In the invention of my prior patent last referred to the cam D is held flat against the end of the screw 2 by means of the collar or washer 10, and said collar is adapted to be received in a bore 13 in the vertical plate F which forms the end support or journal for the top-screw. In this way the faller-cam D may be set close to the bearing-plate F, or in other words with its face abutting the side of said plate, so that the latter acts to guide the faller-bars C downwardly as they pass out from the threads of the top-screw and into the threads of the bottom-screw. It will be understood that in machines of the present type there are certain limitations as regards space which prevent an extended bearing for the screw itself in its journal. By adapting the collar 10 to serve as the end bearing or journal for the cam D, and by making said collar of relatively large diameter I increase the bearing surface for the journal whereby to provide against wear, as set forth in my prior patent last referred to.

As a further improvement, my present invention contemplates means for extending the bearing of the cam itself on the stud 7, by which it is fastened to the top-screw, and this is accomplished in the manner as next described. Referring particularly to Figs. 1 and 3 of the drawings, it will be noted that the cam D is provided with an integral hub 15 projecting from its inner face. As shown more clearly in Fig. 3, the hub 15 is received in an annular channel or recess 16 which is formed by counterboring the end of the screw 2. The counterbore 16 is of less diameter than the body of the screw, in order that the threads thereof may not be weakened. The counterbore or recess 16 surrounds the stud 7 and in this way the bearing surface of the latter is extended to provide a longer support for the cam D. This construction therefore provides a firmer and more secure fastening means for the cam. Referring now to Fig. 4, it will be noted that the hub 15, shown by dotted lines in this view, overlies the inner face of the cam D at the points where the arms of the cam are narrowed or cut away. It will be observed from this view that the arms of the cam are narrowed at these points in order to form the projecting cam lugs or fingers 17 whose rounded cam-faces 6 act against the top of the faller-bars C when the cam is rotated in the direction indicated by the arrow $x$ in Fig. 4. It will thus be seen that the projecting hub 15 of the cam acts to stiffen and strengthen the arms of the cam so that they are less liable to be broken. In this way the hub 15 of the cam D not only provides a more extended support for the cam on its attaching stud 7, but it also serves to strengthen the cam itself, a feature which is most important as has been determined in practice. It has been found that in using the construction of the invention of my prior patent last referred to the cams are sometimes broken across from their axial bores through the narrow part of their arms 5, as this has been the weakest point of the structure of the whole screw. The cams are subject to considerable strain and shock, due to the sticking or jamming of the faller-bars in the threads of the screw and therefore they must be of sufficient strength to stand this strain. I have found that with my present construction the projecting or overhanging hub on the cam reinforces the cams from their bores outwardly to the narrow part of their arms to prevent breakage or rupture of the cams, and consequently my present invention provides a novel and most important improvement in the art.

It will be understood that I do not herein claim the means for fastening the cam to the screw in its broad aspect, but only the improved arrangement for reinforcing the cam and extending its support or bearing on the screw.

What I claim is:

1. An improved top-screw for gill-drawing frames provided with screw-threads on its exterior and formed with an integral stud of reduced diameter projecting axially from its end, a recess countersunk in the end of the screw surrounding the shank of the stud, a faller-cam mounted on the stud and provided with a rearwardly-projecting hub on its inner face fitted to the recess in the end of the screw, and means for fastening the cam in place on the stud with its hub seated in the end recess of the screw.

2. An improved top-screw for gill-drawing frames provided with screw-threads on its exterior and having its end reduced in diameter to form an integral stud projecting axially therefrom and threaded at its extremity, an annular recess cut into the end of the screw surrounding the shank of the stud, a faller-cam having a bore fitted to the stud and provided with a rearwardly-projecting hub on its inner face adapted to be received within the recess in the end of the screw, and means engaging the threaded end of the stud to clamp the cam against the end of the screw with its hub seated in the recess thereof.

In testimony whereof I affix my signature.

WILLIE HOLDSWORTH.